May 31, 1960 A. A. LOMBARD ET AL 2,938,342
GAS TURBINE ENGINES
Filed Aug. 15, 1955 2 Sheets-Sheet 2

INVENTORS
ADRIAN A. LOMBARD
FREDERICK W. W. MORLEY

BY
Leech & Rattorneys
ATTORNEYS

United States Patent Office 2,938,342
Patented May 31, 1960

2,938,342

GAS TURBINE ENGINES

Adrian Albert Lombard, Quarndon, and Frederick William Walton Morley, Castle Donington, England, assignors to Rolls-Royce Limited, Derby, England, a British company Filed Aug. 15, 1955, Ser. No. 528,155

Claims priority, application Great Britain Aug. 24, 1954

9 Claims. (Cl. 60—39.31)

This invention relates to gas turbine engines, and relates in particular to such engines having annularly disposed combustion equipment, either with an annular flame tube or for example with a number of tubular flame tubes. Such annular combustion equipment comprises an inner annular air casing wall and an outer annular air casing wall, and the air casing walls contain between them the air delivered by the compressor or compressors of the engine. There may thus be a considerable difference of pressures across the air casing walls which will thus be subjected to considerable stresses; in addition the outer air casing wall is normally exposed on its outer side to air at substantially atmospheric temperature, whereas the inner air casing wall is surrounded by the flame tube or flame tubes and is thus normally at a higher temperature.

It is one object of the invention to provide a construction of annular combustion equipment for a gas turbine engine which is adapted to withstand the conditions of stress and temperature encountered in operation of the engine.

According to this invention, annular combustion equipment for a gas turbine engine comprises an outer and sole stress-bearing wall of the engine, an inner annular air casing wall forming a working-fluid-containing boundary of the combustion equipment, and means extending across the downstream end of the said combustion equipment to support said inner wall rigidly from said outer wall said means providing substantially the sole support for said inner wall.

The inner wall may have parts remote from said supporting means which are in resilient contact with supporting structure but through which little, if any, load is transmitted. These parts may be arranged to be capable of relative axial movement with respect to the supporting structure.

Preferably said supporting means comprises a number of radially-extending struts, which may be of streamline section.

Usually the stress-bearing outer wall will form the outer air casing wall, which defines the outer working-fluid-containing boundary of the combustion equipment.

In constructions according to the invention, therefore, the upstream end of the inner air casing wall may expand axially, or may deform under stress, independently of the outer air casing wall.

In certain constructions of gas-turbine engine it may be desirable to reduce the forward load on the compressor rotor as compared with the load which would be experienced if the downstream end face of the compressor rotor were exposed, as is common, to the delivery pressure of the compressor, and in accordance with the present invention a chamber on the downstream side of the downstream end face of the compressor rotor and bounded by part at least of said end face is vented to atmosphere or to a point where the pressure is considerably below the compressor delivery pressure, and the inner annular air casing wall of the combustion equipment has an outwardly-extending part which bounds said chamber so that in operation the pressure within the combustion equipment acting on said outwardly-extending part causes a considerable forward load thereon, and the inner air casing wall also comprises a substantially cylindrical part which is secured to the outwardly-extending part, and means is provided extending across the downstream end of the combustion equipment which is secured to said cylindrical part and to the stress-bearing outer wall of the engine to support the inner wall rigidly from the outer wall, said means providing substantially the sole support for said inner wall.

According to a feature of the invention the outwardly-extending part is substantially frusto-conical and forms part of an entry passage of the combustion equipment of increasing cross-section area in the direction of flow. The smaller-diameter end of the frusto-conical part will thus be the downstream end.

According to another feature of the invention the means extending across the downstream end of the combustion equipment comprises a number of radially-extending struts, which may be of streamline section. In the preferred embodiment the struts are in the same radial plane and are secured to the cylindrical part of the inner air casing wall through annularly-extending structure.

According to yet another feature of the invention one or more of the engine mountings, by which the engine is secured in surrounding structure e.g., an aircraft, are secured to the outer stress-bearing wall of the engine adjacent the outer end of a corresponding strut or struts.

According to a further feature of the invention the cylindrical part of the inner air casing wall extends on the upstream side of its junction with the frusto-conical part, and there are provided bracing members therebetween. The bracing members are preferably frusto-conical.

According to yet a further feature of the invention the inner air casing wall has within it an annular sleeve spaced apart from the wall and leaving an annular space between the sleeve and wall which space is in communication at its upstream end with the chamber formed on the downstream side of the compressor and at its other end with the atmosphere through the said struts which are hollow. The struts may have within them cylindrical tubes the inside of which is in communication with atmosphere and which are subjected externally to combustion chamber pressure.

One embodiment of the invention will now be described by way of example with reference to the accompanying drawings, in which.

Figure 1:
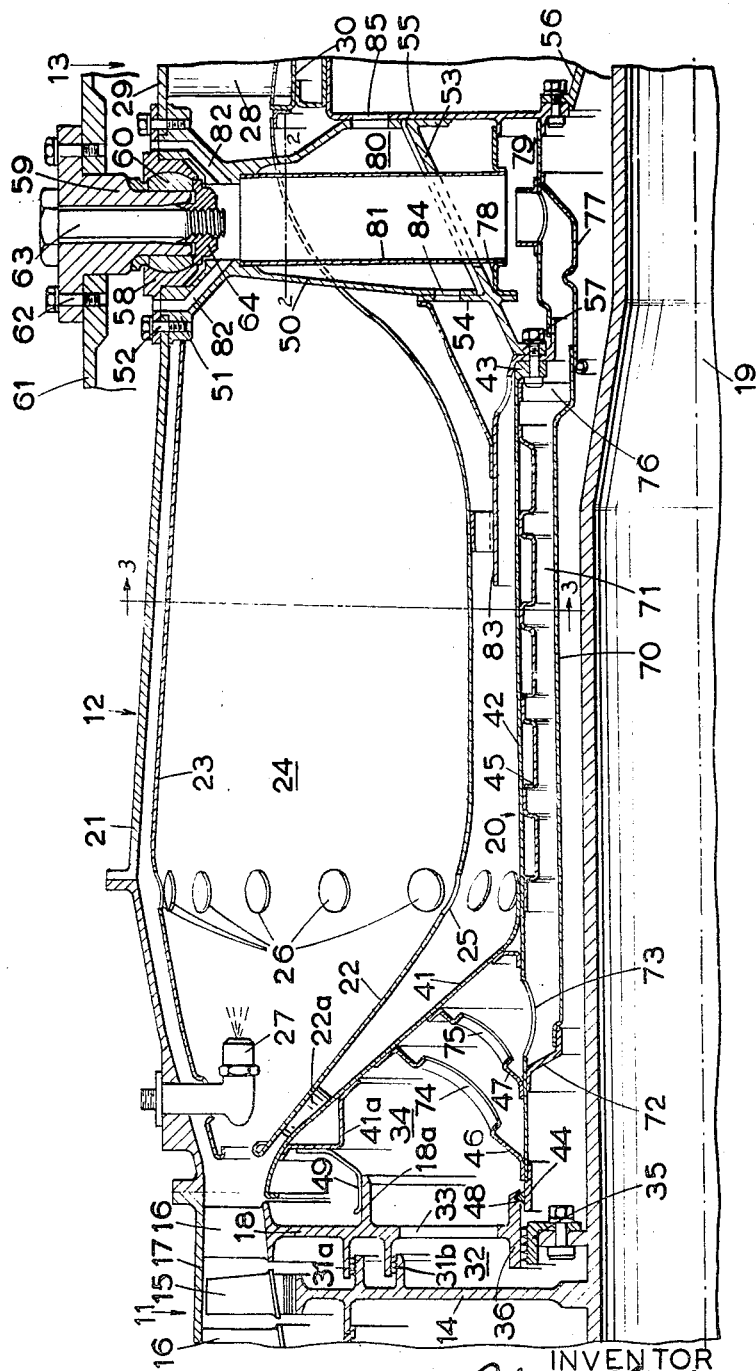
Figure 1 is a central longitudinal section, of the upper portion, of a gas turbine engine constructed according to the present invention.
Figure 2:
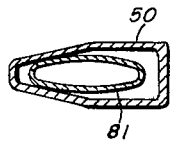
Figure 2 is a fragmentary horizontal section taken on line 2—2 of Figure 1.
Figure 3:
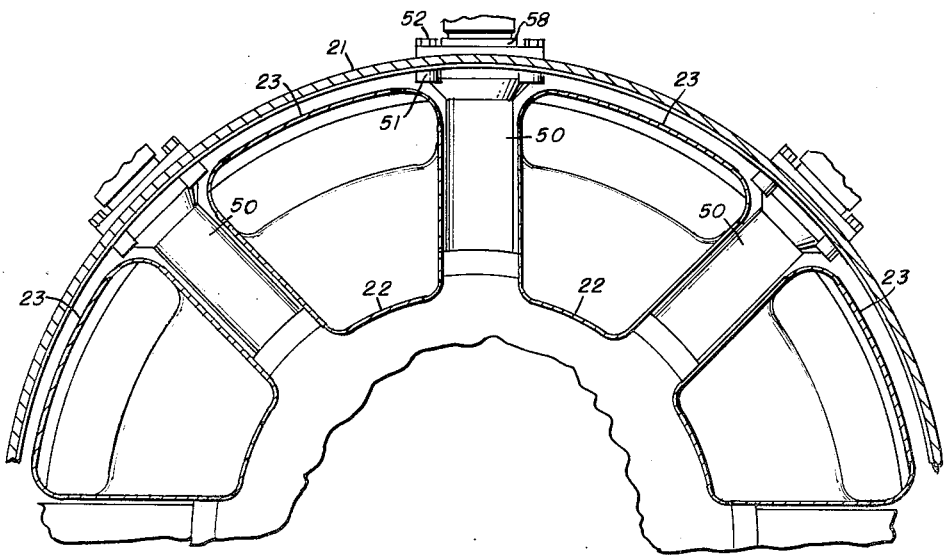
Figure 3 is a fragmentary radial section taken on line 3—3 of Figure 1, certain parts being in elevation.

The gas turbine engine comprises a multi-stage axial-flow compressor, the outlet end of which is shown at 11, combustion equipment 12 into which air compressed by the compressor is delivered to have fuel burnt in it, and an axial-flow turbine, part of which is shown at 13, which is driven by the products of combustion.

The compressor rotor comprises a number of discs 14, at the periphery of each of which is carried a row of rotor blades 15. The rows of rotor blades 15 alternate with rows of stator blades 16 carried by the stator casing 17, and the row of stator blades of the last stage of the compressor supports inwardly of the blades and on the downstream side of the rotor disc 14 of the last stage of the compressor an annular diaphragm structure 18.

Connected to the compressor rotor to drive it by means of a shaft 19 is the rotor (not shown) of the axial-flow turbine 13; the shaft 19 is mounted in suitable bearings. The combustion equipment 12 surrounds the shaft 19 between the compressor and turbine rotors, and comprises concentric inner and outer annular air casing walls, which contain the air delivered by the compressor. The inner wall is shown generally at 20, and the outer wall is shown at 21. The combustion equipment also comprises inner and outer flame tube walls 22, 23 between the air casing walls, and the flame tube walls define between them an annular space 24 in which combustion takes place, and may be provided with any known or convenient form of apertures such as 25, 26 for the admission of air to the combustion space. A fuel injector 27 is provided, which may be mounted as shown on the outer air casing wall 21.

The combustion products are discharged from the downstream end of the combustion space 24 to a row of nozzle guide vanes 28, which direct the gases onto the turbine rotor blades, and the nozzle guide vanes are mounted between outer structure 29, formed by a rearward extension of the outer air casing wall 21, and an inner ring 30 which is itself mounted on structure which will be described below.

Now it is well-known that in operation of an axial-flow compressor an axial thrust is generated on the rotor towards its inlet, and such a thrust is transmitted by the rotor of compressor 11 to shaft 19; in operation of an axial-flow turbine an axial thrust is generated towards its outlet, and in the arrangement shown this thrust will be transmitted by the rotor of turbine 13 to shaft 19 to oppose the forward thrust of the compressor.

However it may be desirable to reduce the forward load on the compressor in certain cases, for example when the forward thrust of the compressor greatly exceeds the rearward thrust of the turbine, and both are transmitted to the shaft 19, and it is desired to reduce the thrust loading acting on the bearings of the shaft.

For this purpose labyrinth seals 31a, 31b are provided between the last-stage rotor disc 14 and the diaphragm structure 18, adjacent the periphery of the disc, and the annular space 32 between the labyrinth seal 31b and the shaft and on the downstream side of the last-stage rotor disc is vented to a region at low pressure, for example to atmosphere, through large apertures 33 formed in the diaphragm structure 18, which lead to the space 34 between the diaphragm structure 18 and the forward end of the inner air casing wall 20. A labyrinth seal 35 is also provided between a flange 36 on the inner diameter of the diaphragm structure 18 and the shaft 19.

In this way, since the downstream surface of the last-stage rotor disc of the compressor is subjected to a low pressure over the area between the labyrinth seal 31b and the shaft 19, instead of to the delivery pressure of the compressor, the forward axial thrust on the compressor rotor is reduced.

However since the space 34 is at a low pressure, and the region between the air casing walls 20, 21 is at the delivery pressure of the compressor, a considerable load is imposed on the inner air casing wall 20. Hitherto it has been customary for the inner air casing wall to be secured to the outer wall at the forward end of the combustion equipment 12, for example by aerofoil-section struts extending across the compressor outlet duct between the walls 20, 21.

In this construction, however, and in accordance with the present invention the inner air casing wall is constructed and supported in the following manner. At the forward end of the combustion equipment the wall 20 has a frusto-conical sheet-metal section 41, of which the smaller-diameter end is downstream, to assist in providing an entry of increasing cross-section area for the combustion equipment, this section 41 separating the space within the combustion equipment from the space 34. At its smaller-diameter end the section 41 is secured to a cylindrical sheet-metal section 42 between the ends of the latter, the downstream end of the cylindrical section being formed with an inwardly-directed flange 43, and the upstream end being secured to a machined ring 44. The cylindrical section 42 is reinforced by a corrugated section 45 downstream of its junction with the frusto-conical section 41, where it is subjected to the pressure within the combustion equipment.

Frusto-conical bracing members 46, 47 extend between the frusto-conical wall section 41 and the upstream end of the cylindrical wall section 42, the bracing members having flanges by which they are welded to the wall sections, and lying parallel to one another. There is also provided a sealing ring 48 carried in a groove in flange 36 and co-operating with the machined ring 44.

The section 41 is formed with a stiffening ring 41a which carries a sealing member 49 in sliding engagement with a flange 18a extending axially on the downstream side of the stationary diaphragm 18. Section 41 may also provide a support for one or both the flame-tube walls 22, 23, for example by means of a streamlined strut as indicated at 22a.

The inner air casing wall 20 is supported from the outer wall 21 by a number of radially-extending struts 50. Each strut is hollow and is of substantially streamline section over part of its length, changing to a rectangular section at its inner end, and is formed with a flange 51 at its outer end which is secured to the outer wall 21 by setscrews 52. The rectangular inner end of each strut 50 is secured to structure which includes a frusto-conical wall 53 and a pair of transverse radially-extending walls 54, 55, the strut 50 being located between the walls 54, 55 and abutting the next adjacent struts in the circumferential direction. The ring 30, in which the nozzle guide vanes are mounted, is secured to the outer end of wall 55, and a frusto-conical member 56 to support a bearing for shaft 19 is secured to its inner end. The frusto-conical wall 53 has a flange 57 at its upstream, narrower end which is bolted to the flange 43 of the inner air casing wall.

The engine mounting arrangement by which the engine is secured in the aircraft is conveniently aligned with the struts 50, two (or in certain cases three) of the struts being adapted to receive within their outer ends a flanged socket member 58 which is bolted to the outer casing 21, for example by setscrews 52. The socket member 58 receives a trunnion member 59, and there is provided a ring 60 therebetween, the outer surface of the ring 60 and the inner surface of the socket member 58 being part-spherical. The trunnion 59 is mounted in aircraft structure 61 by setscrews 62, and the assembly is secured in position by a bolt 63 which passes through a central hole in trunnion 59 and engages with a nut 64. The latter is restrained against rotation by keyed engagement with the socket member 58.

Space 34 is vented to atmosphere in the following manner. An inner sleeve 70 is provided within the cylindrical section 42 to define an annular passage 71 which is closed at its upstream end by a flange 72. Section 42, upstream of its junction with member 41, and bracing members 46, 47 are formed with apertures 73, 74, 75 respectively, thus placing space 34 in communication with passage 71.

At its downstream end sleeve 70 is supported from section 42 by straps 76 and is in sliding engagement with a cylindrical member 77 carried by the inner end of wall 55.

A cylindrical sealing member 78 extends between the inner ends of walls 54, 55, separating a space 79 which is in communication with passage 71 from a space 80 within the rectangular inner ends of the struts 50.

Each strut is provided with a cylindrical tube 81 which is secured at its inner end to member 78 and has its outer end spigoted into sealing engagement with part of the flange 51 at the outer end of the strut. The flanges 51 and the members 58 of the engine mountings are formed with drillings 82 which communicate with atmosphere, and thus the space 79, and hence the space 34, are placed in communication with atmosphere through tubes 81 and drillings 82. The tubes pass with a clearance through holes in wall 53. The space 80 is placed in communication with the high-pressure air in the combustion chamber through scoop 83 which extends upstream to a point at which the air is not unduly heated by the combustion, and through apertures 84 in the rectangular parts of struts 50 and the wall 54 secured thereto. The space 80 also communicates with the space on the upstream side of the turbine rotor through apertures 85 in the struts and wall 55 secured thereto, and thus high-pressure cooling air is delivered through space 80 to the turbine rotor.

It will be appreciated that the invention provides a gas-turbine engine structure which is well adapted to define the desired shape of combustion chamber and to resist the loads imposed thereon, especially the load which is imposed on the frusto-conical section 41 of the inner air casing wall 20 for the reasons discussed above. The forward component of this load is taken in tension by the cylindrical wall 42, and is then transmitted through structure 53, 54, 55 to the struts 50. These in turn transmit the load either to the outer air casing wall 21, which forms a primary structural member of the engine, or direct to the engine mounting 58, 59, 60. It will also be seen that the inner air casing wall 20 is free to slide axially, on expansion and contraction, relative to diaphragm 18 and outer wall 21 at its forward end.

The space 32 on the downstream side of the last-stage compressor rotor disc is vented to atmosphere in a desirable manner, and it will also be appreciated that the use of tubes 81 for venting purposes, their interiors being substantially at atmospheric pressure and their exteriors being subjected to combustion chamber pressure, provides an extremely light and strong structure to withstand the differential pressure loads. It will be seen that the structure 53, 54, 55 is only subjected to the differential pressure load just referred to over a small part of the inner ends of members 53, 55. The sealing member 78 which is subjected to the differential pressure load is of cylindrical form and thus well adapted to withstand the load.

What we claim:

1. A gas turbine engine having annular combustion equipment, comprising a compressor having a rotor, an inner air casing wall, an outer stress-bearing wall for the engine, means forming a chamber on the downstream side of the downstream end face of the compressor rotor bounded by part at least of said end face, means venting said chamber to a point where the pressure is considerably below the compressor delivery pressure, the inner annular air casing wall of the combustion equipment having an outwardly-extending part which also bounds said chamber so that in operation the pressure within the combustion equipment acting on said outwardly-extending part causes a considerable forward load thereon, the inner air casing wall also comprising a substantially cylindrical part which is secured to the outwardly-extending part, and means extending across the downstream end of the combustion equipment secrued to said cylindrical part and to the stress-bearing outer wall of the engine to support the inner wall cantilevered rigidly from the outer wall.

2. An engine as claimed in claim 1 in which the outwardly-extending part of the inner air casing wall is substantially frusto-conical and forms part of an entry passage of the combustion equipment of increasing cross-section area in the direction of flow.

3. An engine as claimed in claim 1 having a stationary diaphragm adjacent the downstream end of the compressor, means placing said outwardly-extending part and said cylindrical part of said inner annular wall both in sealing engagement with said stationary diaphragm said means being constructed to permit relative axial movement between said wall parts and said diaphragm.

4. An engine as claimed in claim 1 in which the means extending across the downstream end of said combustion equipment which support said inner air casing wall are struts extending in the same radial plane, and annularly extending structural means securing said struts to the said cylindrical part of said inner air casing wall.

5. An engine as claimed in claim 1 in which the cylindrical part of the inner air casing wall extends on the upstream side of its junction with the frusto-conical part, and there are provided bracing members between and connecting said parts beyond said junction.

6. An engine as claimed in claim 5 which said bracing members are frusto-conical.

7. An engine as claimed in claim 4 in which the inner air casing wall has within it an annular sleeve spaced apart from the wall and leaving an annular space between the sleeve and wall, means placing said space in communication at its upstream end with the chamber formed on the downstream side of the compressor rotor and means at its other end connecting said space with the atmosphere through the said struts which are hollow.

8. An engine as claimed in claim 7 in which the struts have within them cylindrical tubes the inside of which is in communication with atomsphere and said space, and means subjecting said tubes externally to the pressure in the combustion equipment.

9. The gas turbine engine as defined in claim 1 in which said last-mentioned means provides the sole, fixed rigid support for said inner wall.

References Cited in the file of this patent

UNITED STATES PATENTS

| | | |
|---|---|---|
| 2,647,684 | Lombard | Aug. 4, 1953 |
| 2,686,401 | Newcomb | Aug. 17, 1954 |
| 2,743,579 | Gaubatz | May 1, 1956 |

FOREIGN PATENTS

| | | |
|---|---|---|
| 715,486 | Great Britain | Sept. 15, 1954 |